May 26, 1942.  A. B. JOHNSON  2,284,210
METHOD OF CLOSING THE ENDS OF TUBULAR BODIES
Filed Dec. 5, 1939
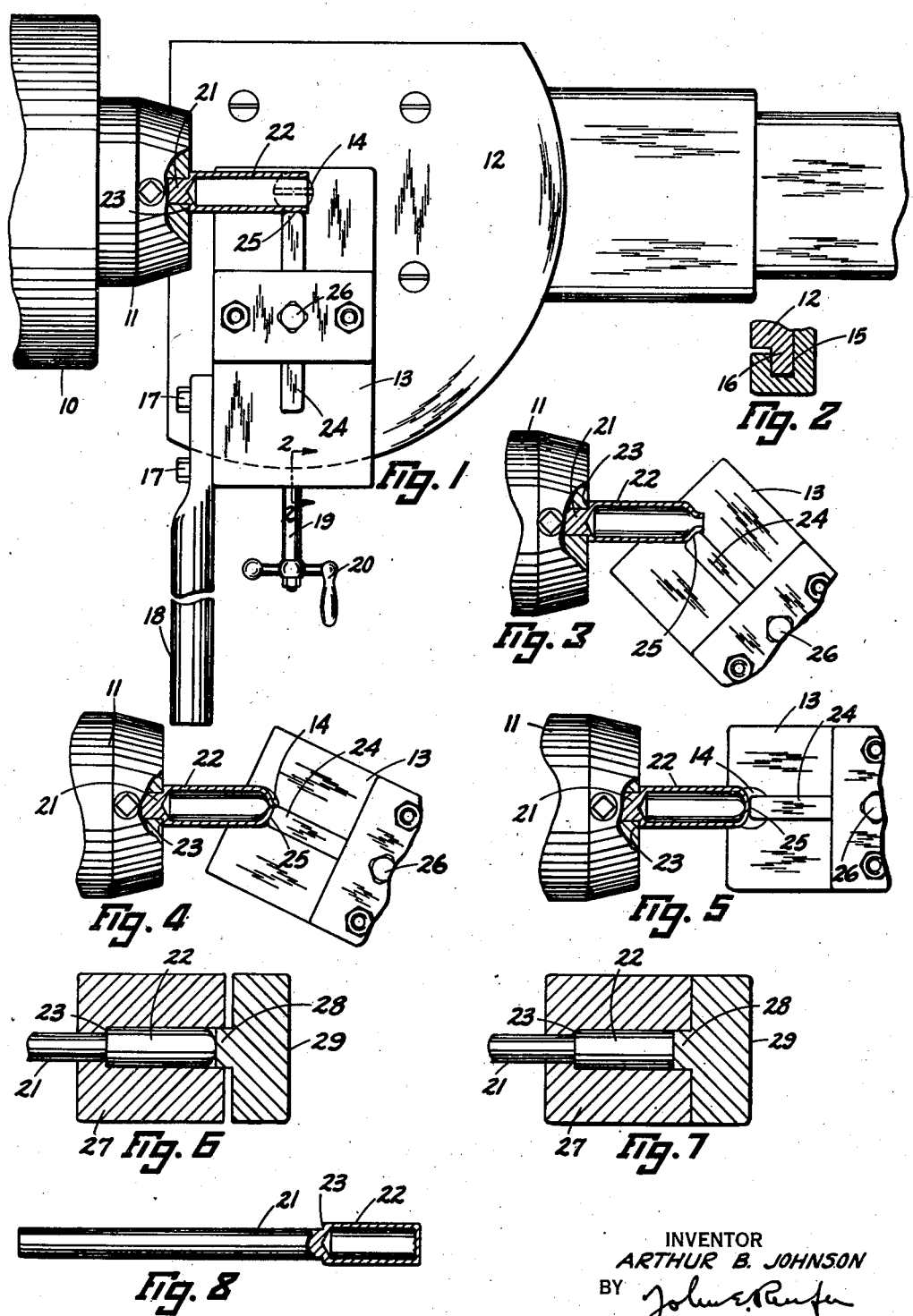
INVENTOR
ARTHUR B. JOHNSON
BY
ATTORNEY Patented May 26, 1942

2,284,210

UNITED STATES PATENT OFFICE 2,284,210

METHOD OF CLOSING THE ENDS OF TUBULAR BODIES

Arthur B. Johnson, University Heights, Ohio, assignor to The Cleveland Pneumatic Tool Company, Cleveland, Ohio, a corporation of Ohio Application December 5, 1939, Serial No. 307,663

6 Claims. (Cl. 29—148.2)

This invention relates broadly to a novel method of producing tubular members with closed ends forming an integral part of the members, but more particularly to the method of making the closed hollow heads of rams or the like such as used in portable pneumatic tools of the sand rammer or back fill tamper type.

One object of this invention is to produce tubular members with integral closed ends without necessitating the use of welds or the like tending to alter the physical characteristics of the metal.

Another object of this invention is to close one or both ends of a tubular member in a manner affording flat end walls of a thickness substantially equal to that of the side wall of said member.

Another object of this invention is to produce a ram for portable pneumatic tools such as sand rammers or the like, wherein the hollow head thereof is closed in a manner capable of being subjected to its usual vibrations resulting from the rapid reciprocation of the ram without danger of loosening the connection between the head of the ram and the closed end thereof.

Another object of this invention is to produce a simple, efficient and relatively inexpensive method of permanently closing the ends of tubular members.

In the drawing:

Fig. 1 is a top plan view of a portion of a machine used for closing the end of a tubular member in accordance with the invention.

Fig. 2 is a cross sectional view taken in a plane indicated by line 2—2 in Fig. 1.

Figs. 3, 4 and 5 are views illustrating different stages of the closing or spinning operation.

Fig. 6 is a longitudinal sectional view of cooperating dies with the tubular member positioned for final operation.

Fig. 7 is a view similar to Fig. 6 illustrating the dies and tubular member at the end of the final operation.

Fig. 8 is a top plan view, partly in section, of a member or ram produced in accordance with the invention.

Referring to the drawing, 10 represents the head of a lathelike machine having a chuck 11 operatively mounted on the spindle thereof for rotation therewith. 12 represents the table of the machine, which table is partly circular and perfectly flat, and has mounted thereon a carriage 13 swingable around the pivot 14. The carriage is formed with a circular guideway 15 operatively associated with the circular border of the table which forms a guide 16 fitting in the guideway 15 for preventing upward movement of the carriage relative to the table. To one side of the carriage is also secured by bolts 17 a relatively long handle 18 through which the carriage may be swung around the pivot 14. The carriage 13 may also be moved radially relative to the pivot 14 by the usual mechanism including the screw 19 and the operating handle 20.

The work is represented by a ram 21 formed with a cylindrical open ended hollow head 22 forming with the ram 21 an annular shoulder 23. In practice, the ram 21 is inserted in the chuck 11 and clamped therein with its head 22 extending axially therefrom as clearly shown in Fig. 1. Carried by the carriage 13, there is a tool 24 having a slightly rounded blunt end 25 engageable with the tubular member or head 22 in the manner about to be described. The tool 24 being rigidly secured to the carriage by a cap screw 26.

While the work is being rotated at a relatively high speed, the blunt end 25 of the tool 24 is fed against the side wall of the head 22. The engagement of the tool with the work is calculated to take place at a distance from the open end of the work slightly greater than one-half the outside diameter of the work or head 22, thereby providing sufficient stock to be spun over the end of the work for closing the latter. Subsequently, through the relatively long handle 18 secured to the carriage 13, the carriage 13 is gradually swung around the pivot 14, thereby causing swinging movement of the tool 24 and more particularly of its blunt end 25 over the end of the work for causing the gradual inward movement of the side wall of the work adjacent the open end thereof as shown in Fig. 3. As the carriage 13 and tool 24 are finally swung into closer coaxial position with the work, the end of the work will assume the shape shown in Fig. 4, and when the carriage and tool are finally rotated 90° from their original position, the end of the work will assume the closed domelike shape shown in Fig. 5.

In practice, while performing the closing operation above described, the rotary speed of the work together with the pressure of the tool end 25 must be such as to create sufficient frictional resistance causing the open end portion of the work to gradually heat to a readily deformable condition, which heat will gradually increase until the extreme end of the work, when shaped substantially as in Fig. 4, reaches a substantially fusing condition, thus resulting in the now inturned side wall of the work to actually melt together for producing the solid domelike end wall shown in Fig. 5.

In order to materially speed up the spinning operation above described especially when dealing with tubular members of relatively heavy or thick side walls, it has been found advisable to first preheat the end portion of the work intended to be closed to a temperature of 1400° to 2000° F., and thereafter closing the end of the work in the manner above described. In this instance, the work being already heated to a more or less readily deformable condition, can easily be shaped into the closed domelike end shown in Fig. 5.

After the work has been spun as above described, it is removed from the chuck 11 and placed into a die 27 which is made to fit closely around the head 22, the die 27 being also adapted to receive the stem 28 of another die 29. Subsequently, the two dies 27 and 29 are moved toward each other, thereby causing the stem 28 to flatten the domelike closed end of the head 22 while the die 27 prevents lateral expansion of the head, thus resulting in the hollow closed flat end of the head 22 shown in Fig. 8.

When dealing with relatively large and heavy tubular members, it has been found desirable before flattening the dome end of the work to again preheat that end portion to a temperature of 1400° to 2000° F., in which instance the stock being in a more or less plastic condition will more readily be capable of assuming the desired shape.

I claim:

1. The method of closing the normally open end of a steel tubular member which consists of axially rotating said member, feeding against said member near the open end thereof the blunt end of a tool and gradually swinging said tool over the end of said member around an axis perpendicular to the center axis of said member, the rotary speed of said member together with the pressure of said tool against said member being such as to heat that end portion of said member into a readily deformable condition, said tool being made to first engage said member at a predetermined distance from the open end thereof to cause upon swinging movement of said tool over the end of said member within an arc of about ninety degrees the gradual reduction of the diameter of said end portion into a closed domelike end wall.

2. The method of closing the normally open end of a steel tubular member which consists of axially rotating said member, pressing against said member near the open end thereof a blunt tool and while so pressed against said member gradually swinging said tool over the end of the member around an axis perpendicular to the center axis of said member to cause gradual inward movement of the side wall portion of said member adjacent said open end into a closed domelike end wall, the rotary speed of said member together with the pressure of said tool against said member being such as to gradually heat that end portion of said member to a substantially fusing condition during the final closing stage of said end.

3. The method of closing the normally open end of a steel tubular member which consists of preheating that end portion of said member to a temperature of 1400° to 2000° F., subsequently axially rotating said member, pressing against said member near the open end thereof a blunt tool and gradually swinging said tool over said end around an axis perpendicular to the center axis of said member to cause gradual inward movement of the side wall portion of said member adjacent said open end into a closed domelike end wall.

4. The method of closing the normally open end of a steel tubular member which consists of preheating that end portion to a temperature of 1400° to 2000° F., subsequently axially rotating said member, pressing against said member near the open end thereof a blunt tool and gradually swinging said tool over said end around an axis perpendicular to the center axis of said member to cause gradual inward movement of the wall of said member adjacent said open end into a closed domelike wall, the rotary speed of said member together with the pressure applied thereon by said tool being such as to increase the preheating temperature of said end portion to a substantially fusing condition during the final closing stage of said end.

5. The method of producing a normally open ended steel tubular member with a substantially flat closed end perpendicular to the center axis of said member which consists of axially rotating said member and while so rotated pressing against its side wall near the open end thereof a blunt tool and gradually swinging said tool over the end of said member to cause gradual inward movement of the wall of said member adjacent said open end into a closed domelike end wall, the rotary speed of said member together with the pressure of said tool against said member being such as to gradually heat that end portion of said member to a substantially fusing condition during the final closing stage of said end, and subsequently pressing flat said domelike end wall while preventing lateral expansion of said member.

6. The method of closing the normally open end of a metallic tubular member which consists of axially rotating said member, pressing against said member near the open end thereof a blunt tool and while so pressed against said member gradually swinging said tool over the end of said member from an initial transversal position of said tool relative to said member to a final position of the tool lengthwise of the member.

ARTHUR B. JOHNSON.